June 20, 1944.  J. R. BENFORD  2,351,736
MICROSCOPE ILLUMINATING DEVICE
Filed April 18, 1942  2 Sheets-Sheet 2
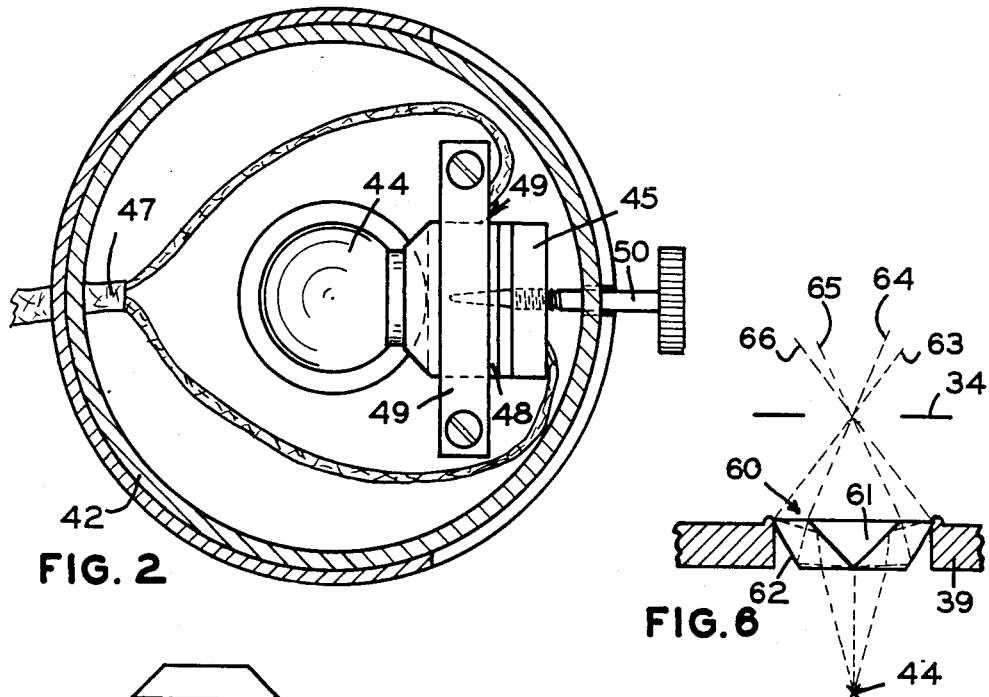
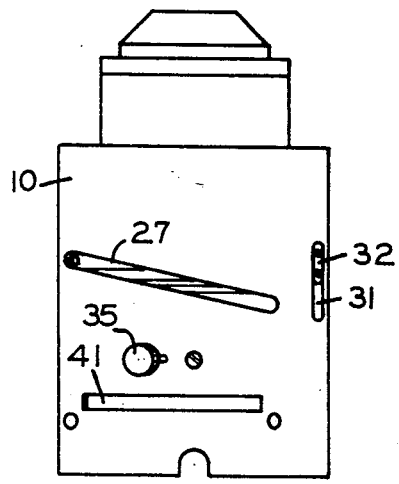
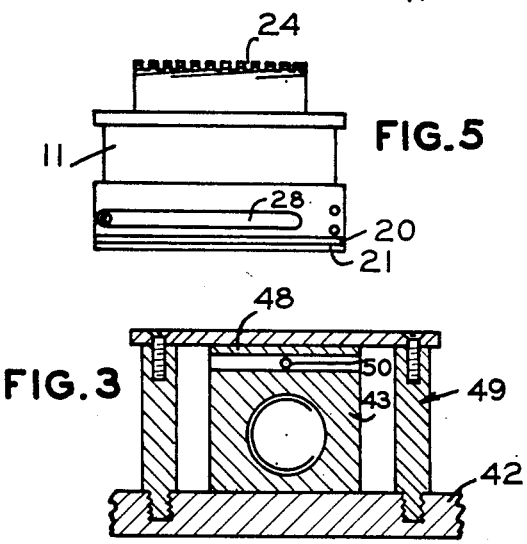
JAMES R. BENFORD
INVENTOR Patented June 20, 1944

2,351,736

UNITED STATES PATENT OFFICE 2,351,736

MICROSCOPE ILLUMINATING DEVICE

James R. Benford, Rochester, N. Y., assignor to Bausch & Lomb Optical Company, Rochester, N. Y., a corporation of New York Application April 18, 1942, Serial No. 439,523

13 Claims. (Cl. 88—40)

My invention relates to optical instruments and more particularly has reference to an illuminating device for use with a microscope. An object of my invention is to provide simple and improved means for illuminating a specimen undergoing microscopic examination. Another object is to devise novel condenser lens means which possesses the ability to vary the size of the illuminated field. Still another object is the provision in a microscope condenser of movable lens means whereby to vary the effective focal length of the condenser, and hence the size of the illuminated field, as well as the provision in such condenser of adjustable diaphragm means, the aperture of which is varied in size upon and in accordance with the movement of the movable lens means, so as to provide a fine control for the numerical aperture of the condenser.

Further objects of the invention are to locate the field diaphragm for an illuminating device at a position wherein it effectively aids the operating efficiency of the device; to provide a novel dark field element, generally useful for converting any type of condenser for dark field illumination; and, in the provision of improved means for adjustably mounting a light source, which means are especially adaptable for use with an illuminating unit. These and other objects and advantages reside in certain novel features of construction, arrangement and combination of parts as will be hereinafter more fully set forth in the appended claims.

In the drawings, wherein like reference characters indicate like parts in the different views:

Figure 2 is a section of the device on the line 2—2 of Figure 1.

Figure 3 is a section of the device on the line 3—3 of Figure 1.

Figure 4 is an elevation of the device with parts thereof removed.

Figure 5 is an elevation of one of the lens carrying sleeves of the device.

Figure 6 is an enlarged schematic view showing operation of a dark field element used with the illuminating device.

Figure 1:
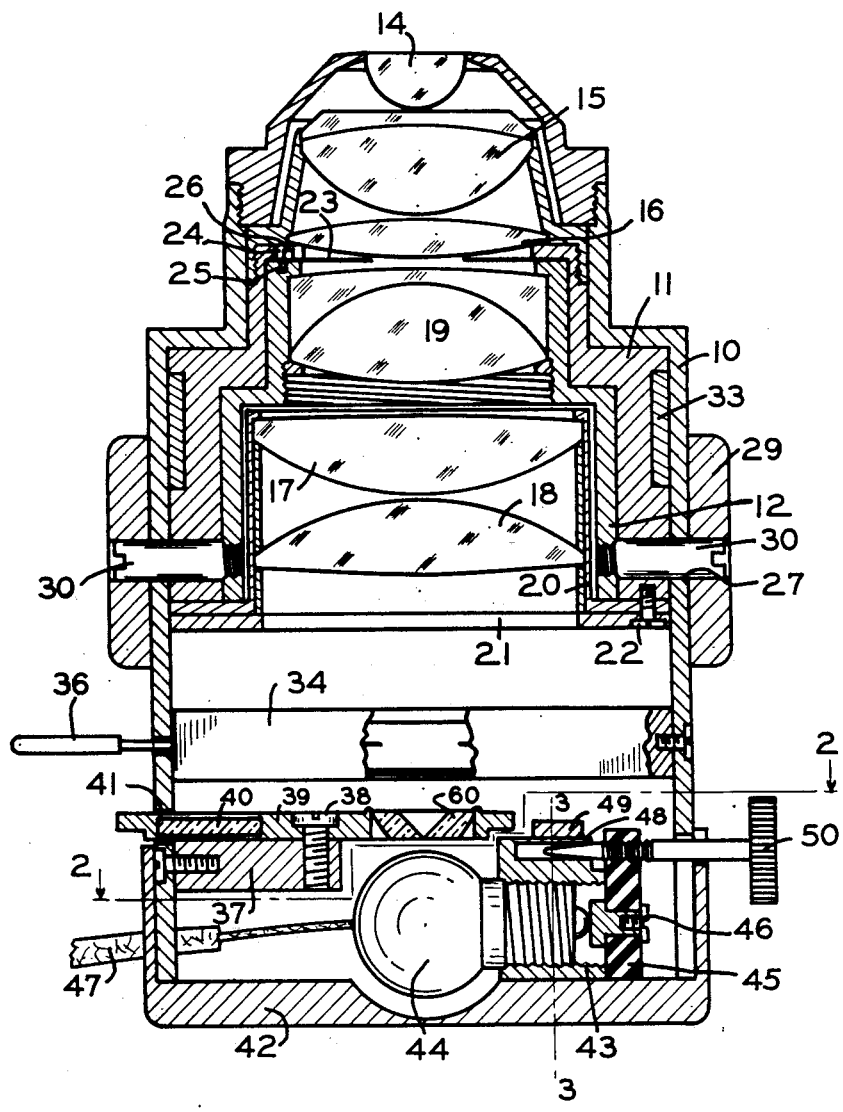
Figure 1 is a cross sectional view of the illuminating device of my invention.

Procedure commonly accepted as most ideal for conducting microscopic examination under higher powers of magnification makes use of a condenser which transmits a light beam of sufficient angular convergence and size in the plane of the specimen to just fill the back lens and the field of the objective used for observation. The condition that the back lens of the objective be filled with light is satisfactorily fulfilled when a condenser and objective of equal numerical aperture or N.A. are employed together. The present invention comprehends extremely close reproduction of these desired conditions for illumination, while avoiding the necessity of using objectives and condensers of matched N.A., by incorporating means in a condenser for simultaneously varying, with a fine degree of precision, both the angular convergence of the light and the size of the field illuminated by the condenser.

A successful embodiment of the invention is shown in the drawings as comprising a tubular casing 10 in which tubular sleeves 11 and 12 are movably mounted, these sleeves and the casing being concentric with each other. Sleeve 12 is journalled in sleeve 11 for rotation with respect thereto and sleeve 11 is slidably engaged within the walls of the casing 10 so that it may be moved longitudinally with respect to the casing. As will shortly appear, the inner sleeve 12 is carried by the outer sleeve 11 so that it is linearly movable with the outer sleeve. The casing 10 and sleeves 11 and 12 are adapted to support condenser lens elements in axial alignment so that the optical axis of the lens system coincides with the longitudinal axis of the casing 10. A lens element 14 in the form of a hemisphere is mounted at the front end of the casing 10 while lens elements 15, 16, 17 and 18 are carried by the outer sleeve 11 and the lens element 19 is carried by the inner sleeve 12.

Element 14, shown as a hemisphere, although lens elements of other shapes may be substituted therefor, is adapted to form the front element of the condenser system and is supported in a conventional holder which is screwed onto the front end of the casing 10 to form an extension of the casing. By providing a pair of holders, one supporting a dark and the other a bright field front element, the illuminating device may be readily converted for either type of illumination by use of the proper element. When the element 14 is mounted for operation, it is to be noted that its position remains fixed with respect to the movement of the other lens elements.

Also, the condenser system may be converted to dark field illumination without first removing the element 14 merely by interposing a suitable dark field element between the back lens of the condenser system and the light source associated therewith, such practice making it unnecessary to replace the light field element 16 with a dark field device. In fact, the just mentioned practice is preferred since it provides a more efficient method of illuminating the specimen. A separate dark field element and the means for mounting it in the illuminating device will be hereinafter pointed out.

Lens element 15 is carried in a suitable lens holder which is screwed or otherwise detachably secured to the front end of the outer sleeve 11 while a flange on this holder retains the lens 16 in seated position on the front end of sleeve 11. Lens elements 17 and 18 are held in a separate cylindrical mount 20 which is located within the bore of the inner sleeve 12. A retainer ring 21 bears against a flange on the mount 20 and screws 22 pass through the ring 21 and this flange to engage sleeve 11 and support the mount 20 from the outer sleeve. The diameter of the mount 20 is such that the wall of the mount clears that of the inner sleeve 12.

Lens element 19 is carried by the inner sleeve and is held in this sleeve by any suitable means, for example, by the conventional retainer means shown in the drawings. Where the inner sleeve 12 and its lens means are maintained in substantially centered relation to the optical axis, interference with the successful operation of the device, by reason of the rotation of the sleeve 12, is avoided.

As intimated, my invention employs an aperture stop shown as an adjustable diaphragm which is actuated simultaneously with the linear movement of the movable lens means. This diaphragm is of the usual iris type and has a plurality of leaves 23, the ends of which are engaged between flange portions provided on the front ends of the sleeves 11 and 12. The flange portions at the front ends of the sleeves 11 and 12 are respectively provided with solts 24 and bored holes 25. A pin 26 extends through a hole in one end of each leaf and engages with a slot 24 while a second pin 26 extends through the other end of each leaf and engages with a hole 25 so that each leaf is secured to the sleeve 11 and also to the sleeve 12.

It will be apparent from the foregoing that rotation of sleeve 11 will cause the diaphragm leaves 23 to be moved towards each other or to be separated and also that the actuation of the diaphragm can occur while the sleeves 11 and 12 are being moved lengthwise of the casing 10. The iris diaphragm is so arranged that its aperture is centered on the optical axis of the lens system and the plane of the aperture is substantially perpendicular to such axis.

In effecting the linear movement of both sleeves and the simultaneous rotative movement of the inner sleeve 12, use is made of a pair of substantially similar shaped slots 27 which are formed through the casing 10. Each slot 27 is a portion of a helix which extends around the casing 10 and the two slots are located so that they are diametrically opposite each other. Use is also made of a pair of substantially alike circumferential slots 28 formed through the outer sleeve 12, these slots 28 also being located diametrically opposite to each other.

Means for moving the sleeves employ a knurled ring 29 which is slipped over the casing 10 and is slidably and rotatably mounted thereon. A pair of pins 30 is employed for coupling the ring 29 to the sleeves 11 and 12 and the sleeves to each other. Each pin 30 extends through the ring 29, a helical slot 27 in the casing and a circumferential slot 28 in the outer sleeve 11 and has its inner end threaded into the inner sleeve 12. Assuming frictional contact between sleeve 11 and casing 10 sufficient to prevent rotation of that sleeve while permitting it to slide lengthwise of the casing, it will be apparent that the turning of the ring 29 will move pins 30 in the helical slots and cause both sleeves to be lifted or lowered while simultaneously causing rotation of the inner sleeve 12 with consequent actuation of the leaves 23 of the aperture diaphragm.

To assure that only linear movement of the sleeve 11 occurs, a keyway 31 is formed in the casing 10 and the sleeve 11 is keyed thereto by a key 32 suitably fastened to the outer surface of that sleeve. Usually the outer sleeve 11 is provided with a circumferential groove in which is mounted a spring bearing ring 33. Ring 33 compensates for wear on the bearing surfaces of the casing 10 and sleeve 11 and also makes it possible to avoid extremely precise machining of the entire outer surface of the latter.

Two pairs of slots 27 and 28 and a pair of pins 30 are used in connecting ring 29 to the lens carrying sleeves although it is possible to carry out the invention with one pair of slots and a single pin. However, a single pin has a tendency to bind in the slots and it is to eliminate this possibility that the sleeves are suspended from a two point support.

A conventional diaphragm unit 34 is removably mounted within the casing 10 by means of screws or other fastenings adapted to extend through the wall of the casing and to engage the unit. Diaphragm 34 provides the field diaphragm for the illuminating device and is located at a suitable distance below the various lens means, preferably at a distance where it will be imaged at unit magnification in the specimen plane when the movable lenses are in their uppermost location or are nearest the front element 14. An advantage derived from using an optical system which has movable lenses and which works near 1/1 magnification resides in the fact that the total distance between the object and the image has a minimum value at such magnification. Consequently, for relatively large motions of the movable lenses, only comparatively small changes will occur in the over-all distance between the object and the image. As a result, the field diaphragm 34 remains substantially in focus in the specimen plane regardless of the position of the movable lenses.

The diaphragm 34 is positioned so that the plane of its aperture is substantially normal to the optical axis and centering screws 35, which extend through openings in the casing, permit the aperture to be centered on the optical axis. A circumferential slot in the casing 10 allows an operating handle 36, used to open and close the diaphragm, to extend through the casing.

Filter means and also a dark field element are carried within the casing 10. For this purpose, a support member 37 is secured, by screws, within the casing at a position below the diaphragm 34. A post 38 on support member 37 has a disk 39 rotatably mounted thereon. Disk 39 carries filters 40, one of which may be of polarizing material, and also a dark field element 60. Suitable openings extend through the disk and allow the filters and the dark field element to be mounted therein by conventional means. The filters 40 and dark field element 60 are located radially on the disk and the disk is mounted so the filters and dark field element may be selectively brought into alignment with the optical axis of the illuminating device on suitable rotation thereof. A slot 41 in the wall of the casing 10 permits the disk 39 to extend therethrough to allow its manual rotation.

A low voltage and low amperage electric bulb 44, which provides a source of illumination, is adapted to be aligned with the optical system of the device at a location below the filter disk 39. To prevent uneven illumination of the specimen as by the imaging of the filament of the light source, the invention proposes to direct diffuse light into the optical system. Each filter 40 is hence provided with a finely ground or frosted surface.

While the use of diffuse light is satisfactory in light field examination, it may be expected that the intensity of the illumination at the specimen plane will fall below that found to be most desirable in dark field work when the front element 14 of the condenser system is of the dark field type. To overcome this condition, while obtaining an even illumination wherein undesirable imaging of the bulb filament is avoided, I make use of a special dark field element 60. A suitable transparent plastic provides an easily shaped material for forming the dark field element 60 and for this reason is generally preferred. However, element 60 may consist of glass or other suitable transparent substance. The dark field element 60 is mounted in the filter disk 39 in any convenient manner.

In plan, the dark field element 60 has a circular shape and substantially flat upper and lower face portions. A centrally located conical recess 61 is provided in the element 60 and the surface 62 which joins the upper and lower face portions of the element is curved. In use, dark field element 60 is mounted so that the apex of the recess 61 is located towards the light source with the base of the cone adjacent the field diaphragm 34. The surface of recess 61 is a total reflecting surface so that light, which enters the lower face portion of the element 60 and which strikes the conical surface, is reflected onto the surface 62. The latter surface is preferably coated with a reflecting layer such as silver or the like and directs light reflected from the conical surface towards the field diaphragm 34.

Light rays from the source 44 which do not strike the surface 61 pass through the element 60 and are lost to the illuminating beam. Rays which contribute to the illumination of the specimen are brought to a focus substantially in the plane of the diaphragm 34 and form a hollow light cone which is defined between the limiting rays 63 and 64 and 65 and 66 shown in Figure 6. Thus, the cross section of the illuminating beam when it enters the condenser system has the annular shape desired for dark field illumination. As in the case of light field illumination, the diaphragm 34 is employed to control the size of the illuminating beam when it enters the condenser system.

The element 60 possesses the advantage of providing even illumination of the specimen. This is due to the curvature of the surface of conical recess 61 and the curvature of the surface 62, both of which cause a distribution of the rays transmitted through the element 60 in a manner to prevent the formation of filament images. Another feature to be noted is the design of the element 60 which besides permitting a compact structure provides a dark field element adapted for use with types of condensers other than that having movable lens elements of the character illustrated by my invention.

The illuminating device of my invention comprehends mounting the light source which is used therewith in the casing 10 to the end of providing an illuminating unit which is complete in itself, in that it comprises condenser lens means and a light source. For this purpose, I employ a cap 42 which has a base portion surrounded by an upturned flange. Cap 42 is frictionally or otherwise detachably engaged with the end of the casing 10 most distant from the front element 14 and provides a closure for the casing.

The inner surface of the base portion of the cap 42 is substantially flat, except for a central recessed portion, and provides a seat for a bulb carrier member 43 in a bore of which is mounted an incandescent bulb 44. Suitably secured to the carrier member 43 is an insulator block 45 having a contact member 46 which is adapted to bear against the contact end of the bulb 44 and to which one of the wires of cable 47 is connected. The second wire of cable 47 is connected to a side of the carrier member 43 which may be formed of metal. Cable 47 is taken through any suitable opening in the cap and is adapted to be connected to a source of electric energy at its end away from the bulb 44.

Carrier member 43 has a substantially flat base which is slidable in any direction on the base portion of the cap 42 so that the filament of the bulb 44 may be substantially centered on the optical axis of the illuminating device. Sufficient clearance between the bulb and the base portion of the cap 42 is provided by the centrally located recess in the base portion to permit the just mentioned adjustment. After the bulb has been suitably aligned with the lens means, it is clamped in this position by the same means which are employed to adjust it.

The adjusting and clamping means just referred to include a metal tongue member 48 which has two substantially parallel bearing surfaces. One end of tongue 48 is supported on the upper face of the carrier member 43 so that its bearing surfaces are spaced above the carrier and are roughly parallel to the upper face thereof when the carrier member is in an unclamped condition. Tongue 48 may be integrally formed with the bulb carrier as shown in the drawings or it may be a separate piece which is secured to the bulb carrier. As illustrated, the carrier member 43 is located on the base portion of the cap 42 so that the upper bearing surface of the tongue 48 is frictionally engaged by the cross piece of a yoke 49 which is suitably mounted on the base portion and which surrounds the bulb carrier to retain the latter on the cap.

Shifting of the carrier member 43 is effected through a screw 50 which passes through a threaded hole in the insulator block 45 and which extends over the edge of the cap 42 where it may be easily manipulated. A suitable slot is cut from the cap end of the casing in a direction parallel to the longitudinal axis thereof in order to permit the screw 50 to project beyond the casing when the cap is in mounted position. The end of screw 50 within the cap 42 is tapered and is unthreaded. This tapered end of the screw is inserted between the tongue 48 and the upper face of the carrier member 43.

As the tongue 48 is relatively thin, it will be apparent that screw 50 acts as a wedge, when it is moved towards the light bulb, and wedges or clamps the carrier member 43 tightly against the yoke 49 as well as against the base portion of the cap to hold the carrier in adjusted position. On backing off the screw 50, this pressure is released and as the tongue 46 is resilient, it returns to a position where it only lightly engages the yoke 49.

In associating the condenser means with a microscope, the upper end of the casing 10 is adapted to be inserted in and frictionally engaged with the usual condenser mount or ring which is movably carried on the conventional substage assembly for the microscope. By suitably racking this ring towards or away from the microscope stage, the condenser means of my invention may be located in proper working relation to the stage. Preparatory to conducting analysis of a specimen, the light source is energized to provide illumination and is then centered with respect to the optical axis of the condensing lenses which are supported in alignment with the observation system of the microscope.

The bulb 44 may be centered with great facility, due to the transmission of diffuse light into the condenser. Assuming the carrier member 43 to be unclamped, centering of the bulb 44 is effected and readily determined by looking through the body tube of the microscope while shifting the carrier member, through non-rotative movement of the screw 50, until the field of view appears evenly illuminated. When the bulb has been thus adjusted, it is clamped in position by suitable rotation of the screw 50. When the bulb has been suitably centered, either light field or dark field examination may be carried out.

Obviously, an optical system functions most efficiently when the light source used therewith is in alignment with the elements of the system. For this reason, frequent practice employs an electric bulb constructed so that its filament is located with extreme precision with respect to some reference point on the bulb. A bulb of this nature is relatively expensive although it does permit the filament to be accurately positioned on the axis of the system when the bulb is engaged in a fixed socket, which latter is also located with care. It will be apparent that my invention allows the use of an inexpensive bulb having a filament which is located within the bulb envelope without regard to this requisite, since conditions for satisfying the same may be effected through suitable movement of the carrier member which supports the bulb.

While I have described the bulb holding means as employed with a microscope condenser, it will be appreciated that such use is not by way of limitation of the invention as its scope comprehends utilizing these means by themselves or with other devices and optical systems.

Operation of the illuminating device for either light or dark field work conforms with the relationship which generally exists in a microscope system between the objective focal length and the size of illuminated field and numerical aperture or N.A. When the sleeves 11 and 12 are in their uppermost position, the diaphragm 23 is in its position of greatest aperture. Movement of collar 29 to lower sleeves 11 and 12 and the lenses carried thereby will, as is well understood by the art, result in increasing the effective focal length of the system. With this increase in focal length, there will also be an increase in the size of the field illuminated while the numerical aperture of the device will become smaller. Thus the construction set forth provides for a variation of field size over a range determined by the limits of the longitudinal movement of the sleeves 11 and 12.

While sliding movement of the condenser lenses will effect variations in both N.A. and field size, it is also desirable to increase the effective range of the condenser by restricting the N.A. to a value smaller than that possible of attainment solely through movement of the lenses. It is for this reason that the aperture diaphragm is interconnected to the means for sliding the sleeves in their casing 10. The helix angle for each slot 27 is calculated with this in mind so that longitudinal movement of the sleeves 11 and 12 and the actuation of the diaphragm 23 will be suitably coordinated.

To set the illuminating means to a N.A. which corresponds with that of an objective being used, it is only necessary to turn the collar 29 in a suitable direction until the back lens of the objective is just filled with light. This condition is best observed by looking into the body tube of the microscope from which the eyepiece has been removed. The invention contemplates providing the device with a scale graduated in field size or in N.A. to the end of facilitating desired adjustment of the illuminating means.

In using the illuminating device for microscopic examination, the field diaphragm 34 and filters 40 are employed in the usual manner for light field examination while for dark field work, the element 60 is placed in operating position. An important feature of the invention resides in its compact construction as well as a design which allows detachable mounting so that it can be used on different instruments.

From the foregoing it will be appreciated that I have accomplished the general purpose of my invention in that besides providing a simple and improved illuminating device, I have perfected a device which has a variable illuminated field that is coordinated with a fine control of N.A. throughout its range. It will also be apparent that the specific aims and objects of the invention which have been heretofore mentioned are attained by the construction set forth and illustrated.

I claim:

1. A microscope condenser comprising a casing, lens means fixedly carried by the casing on the longitudinal axis of the casing, a pair of sleeves, one mounted within the other and one rotatable with respect to the other, the outer sleeve of said pair being slidably engaged by said casing and movable along said longitudinal axis, both of said sleeves being slidably movable together, other lens means mounted in each of said sleeves in alignment with said fixed lens means, adjustable diaphragm means within said casing in alignment with said various lens means, said diaphragm means being connected with said sleeves whereby to vary the aperture of the diaphragm on movement of said sleeves and actuating means coupled to said sleeves whereby to simultaneously move said sleeves longitudinally of said casing while rotating the rotatable sleeve.

2. An illuminating device comprising a casing, lens means fixedly carried at an end of the casing in axial alignment with the casing, an outer sleeve mounted within said casing for linear movement towards and away from said fixed lens means, an inner sleeve mounted within said outer sleeve for rotative movement therein, said outer and inner sleeves being movable longitudinally as a unit with respect to said casing and said inner sleeve being movable with respect to said outer sleeve and said casing while both of said sleeves are mounted in alignment with said fixed lens means, other lens means mounted in each of said sleeves in alignment with said fixed lens means, an iris diaphragm having a plurality of leaves, means connecting one end of each leaf to the outer sleeve and the other end thereof to the inner sleeve whereby to vary the size of the aperture of the diaphragm on rotation of the inner sleeve and actuating means coupled to said sleeves whereby to linearly move said sleeves while rotating said inner sleeve.

3. A microscope condenser comprising a casing, lens means axially positioned at an end of the casing, a pair of sleeves, one sleeve within the other, mounted in the casing for sliding movement as a unit longitudinally of the casing, one of said sleeves being rotatable with respect to the other sleeve and also to the casing, lens means carried by each sleeve in alignment with said first mentioned lens means, adjustable diaphragm means supported on said sleeves and connected thereto for actuation on the rotation of said rotatable sleeve, said diaphragm means being aligned with said lens means, pin means for coupling said sleeves together whereby they may be slidably moved as a unit and whereby the rotatable sleeve may be rotatively moved on movement of the pin means, and guide means extending through said casing and in which said pin means are engaged whereby to control the movement of said sleeves.

4. A microscope condenser of the type having a tubular casing, lens means axially positioned at an end of the casing, a pair of tubular sleeves, one sleeve mounted within the other sleeve and both sleeves mounted within the casing for sliding movement as a unit lengthwise of said casing, one of said sleeves being rotatable with respect to the other sleeve, lens means carried by each sleeve in alignment with the lens means supported by the casing, adjustable diaphragm means supported on and connected to an end of each of said sleeves for actuation on the rotation of said rotatable sleeve whereby the size of the aperture through the innermost of said sleeves is regulated, said casing having a spiral shaped slot through its face, and pin means extending through said slot for coupling said sleeves together whereby they may be slidably moved as a unit and whereby the rotatable sleeve may be rotated on the movement of said pin means, said slot being sloped with respect to the longitudinal axis of the casing at an angle which will cause adjustment of the diaphragm to provide a predetermined numerical aperture for the condenser in accordance with the position of said pin means in said slot.

5. A device for illuminating an object for the purpose of microscopic examination, said device comprising an optical system having a fixed lens element and movable lens elements mounted in alignment therewith, adjustable diaphragm means for varying the aperture of the system, actuating means for moving said movable lens elements along the optical axis of the system, and means interconnecting said diaphragm means and said movable lens elements whereby movement of said movable lens elements by said actuating means simultaneously adjusts said diaphragm means.

6. A microscope condenser comprising a casing, a lens element fixedly carried by said casing on the longitudinal axis thereof, other lens elements aligned in said casing with said fixed element to cooperate with the fixed element in directing light rays which are passed through the casing onto an object, mounting means within said casing for supporting said second mentioned lens elements for movement towards and away from said fixed element for varying the effective focal length of the condenser, adjustable diaphragm means mounted within said casing intermediate two of said movably mounted lens elements, and means interconnecting said diaphragm means and said mounting means whereby movement of said mounting means automatically adjusts said diaphragm means in accordance with the movement of said mounting means.

7. A condenser lens system through which light rays are passed onto an object, said system having a casing, a light source for directing light rays into said casing, a sleeve movable in said casing, a second sleeve movable in said first sleeve, lens means carried by said casing in alignment with said sleeves, other lens means carried by each of said sleeves in alignment with the lens means of said casing, said light rays being directed through said various lens means, adjustable diaphragm means carried by said sleeves in alignment with said lens means, actuating means coupled to said sleeves for moving the sleeves, and means interconnecting said sleeves and said diaphragm means whereby operation of said actuating means simultaneously moves said sleeves and diaphragm means.

8. A device for illuminating a microscopic object, said device having a casing, a sleeve movable in said casing, a second sleeve movable in said first sleeve, lens means fixedly carried by said casing, said sleeves aligned with said fixedly carried lens means, other lens means carried by each of said sleeves in alignment with said first mentioned lens means, a light source, support means secured to said casing for adjustably supporting said light source whereby to center the light source with respect to the optical axis of the lens system, an iris diaphragm carried within said casing and axially positioned on said optical axis, actuating means for simultaneously moving both of said sleeves, and means interconnecting said diaphragm and said sleeves whereby operation of said actuating means for moving said sleeves varies the opening of said diaphragm in accordance with movement of said sleeves.

9. A condenser adapted to be mounted below the stage of a microscope for illuminating a specimen supported on said stage comprising a light source, a fixedly mounted lens, a sequence of lenses coaxially mounted intermediate said light source and said fixedly mounted lens for movement along an axis coincident with the optical axis of said fixedly mounted lens for adjusting the focal length of said condenser, and a field stop intermediate said light source and the last lens of said sequence of lenses, the space between adjacent lenses of said sequence remaining fixed in all adjusted positions of said sequence and being free of additional lenses, the lenses of said sequence cooperating in all adjusted positions thereof with the fixedly mounted lens for imaging said stop on the specimen plane on said stage at varying magnifications.

10. In a condenser adapted to be mounted below the stage of a microscope for illuminating a specimen support on said stage, a single fixed lens forming the exit lens of said condenser, a succession of lenses coaxially mounted for simultaneous movement along an axis coincident with the optical axis of said fixed lens, a light source disposed on said optical axis, a field stop intermediate said light source and said succession of lenses, said succession of lenses being cooperative with said fixed lens and imaging said field stop at varying magnifications on the specimen plane of the microscope in all positions of adjustment of said lenses.

11. A condenser adapted to be mounted below the stage of a microscope for illuminating a specimen supported on said stage comprising a light source, a field stop intermediate said light source and said stage, a fixed lens adapted to be spaced closely adjacent the stage and forming the exit lens of said condenser, and a plurality of lenses coaxially mounted in a fixed sequence intermediate the field stop and said fixed lens for limited movement as a unit relative to said fixed lens along an axis coincident with the optical axis of said fixed lens, said fixed lens and said sequence of lenses imaging said field stop in the plane of the specimen at varying magnifications in all adjusted positions of said sequence of lenses.

12. A condenser adapted to be mounted below the stage of a microscope for illuminating a specimen supported on said stage comprising a casing, a light source disposed in the bottom of said casing, a field stop carried by the casing in superposed relationship with said light source, a lens fixed in said casing at the top thereof and forming the front element of said condenser, and a plurality of coaxially mounted lenses arranged in a fixed sequence within said casing and movable as a unit along an axis coincident with the optical axis of said fixed lens, said movably mounted lenses being carried within said casing intermediate said field stop and said fixed lens and cooperative with said fixed lens whereby said stop is imaged at varying magnifications on the plane of the specimen in all the positions of said sequence of lens.

13. A condenser adapted to be mounted below the stage of a microscope for illuminating a specimen supported on said stage comprising a light source, a field stop intermediate said light source and said stage, an immovable lens intermediate said stage and said field stop, and a succession of lenses coaxially mounted intermediate the field stop and said immovable lens for movement as a unit along an axis coincident with the optical axis of said immovable lens, the contiguous faces of the lenses of said succession being separated by an air space, the immovable lens and said succession of lenses imaging said field stop in the plane of the specimen at varying magnifications in all positions of said succession of lenses, an adjustable aperture stop mounted intermediate a pair of the lenses of said succession of lenses, and means interconnecting said diaphragm and said lenses whereby movement of said lenses automatically adjusts said aperture stop in accordance with movement of said lenses.

JAMES R. BENFORD.